Oct. 9, 1934.                 B. C. TRACEY                1,976,526
RECONDITIONING OF WORN RAIL JOINTS
Filed March 27, 1934

Inventor:
Bernard C. Tracey.
by Harry E. Dunham
His Attorney.

Patented Oct. 9, 1934

1,976,526

UNITED STATES PATENT OFFICE 1,976,526

RECONDITIONING OF WORN RAIL JOINTS

Bernard C. Tracey, Schenectady, N. Y., assignor to General Electric Company, a corporation of New York Application March 27, 1934, Serial No. 717,599

5 Claims. (Cl. 219—10)

My invention relates to the reconditioning of worn rail joints.

From the constant pounding of the wheels of a train passing over a rail joint the ends of the rails at the joint become battered and worn. Excessive wear at the joint soon impairs the riding qualities of the track and greatly increases the wear and tear on the rolling equipment passing thereover. Furthermore, excessive rail batter, resulting from worn rail ends, greatly increases the wear on track fasteners and greatly decreases the life of the rails unless their battered ends can be satisfactorily repaired.

It has already been proposed to repair battered rail ends at track joints by building up the worn surfaces so that the edges of the rail again permit the smooth transfer of wheel loads from one rail to another without objectionable impact. Several welding procedures have been developed for this purpose. According to these procedures weld metal is deposited on the battered rail ends in sufficient quantity to build up the worn surfaces to an elevation slightly greater than the normal track treads. The excess metal thus deposited is then removed to provide a tread of uniform elevation and the joint cross slotted to remove any overflow of weld metal at the ends of the rails.

The finished surface of each reconditioned rail end is required to be smooth, level and free from surface depressions such as may result from an insufficient deposit of weld metal or from craters produced in the deposit by the interruption of an arc welding operation by means of which the deposit is being added to the rail.

It is an object of my invention to provide a simplified procedure by means of which a non-porous smooth deposit may be rapidly applied to the battered rail surfaces of a track joint.

It is a further object of my invention to provide a method of forming a weld deposit which can be quickly reduced to the same elevation as the adjacent running surfaces of the track.

Figure 1:
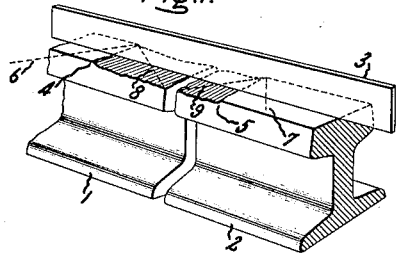
Figure 2:
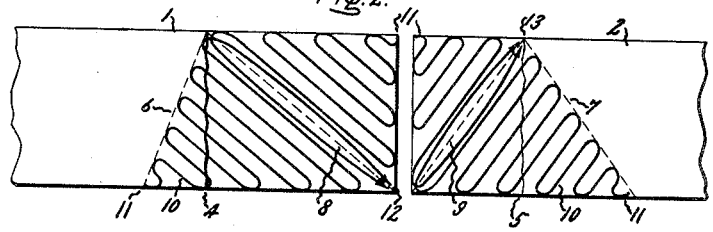

Further objects of my invention will become apparent from a consideration of the following description taken in connection with the accompanying drawing, Fig. 1 of which shows a battered rail joint and method of marking the same for carrying into effect my improved welding procedure; Fig. 2 of which shows the welding procedure employed in accordance with my invention, and Fig. 3 of which shows the manner in which the beads of weld metal are overlapped on one another when following my procedure.

In accordance with my procedure the approximate inner limit of substantial wear on the tread of each rail 1 and 2 at the joint is determined by laying a straight edge 3 on the treads of the rails longitudinally thereof across the joint. The limits 4 and 5 are then gauged by observing the distance between said straight edge and the treads of the rails. Generally the worn surface is greater on one rail end than the worn surface on the other rail end as indicated in the drawing. The inner limit of welding on each rail end is then marked with oblique lines 6 and 7 which define quadrilateral areas which include the worn rail end surfaces. In the layout illustrated in the drawing the oblique lines 6 and 7 intersect the worn surfaces at the sides of the rails, thus limiting the welding areas to a minimum but this is not essential. The quadrilateral areas thus determined are then divided into triangular sections by diagonals 8 and 9. The markings 6, 7, 8 and 9 may be made in any convenient manner, for example, by chalk lines. The worn rail surface is then restored by depositing a flat sinuous bead of weld metal 10 in each triangular section by a welding operation which is started at the vertices 11 opposite the diagonals 8 and 9 and terminated at one end of these diagonals. If the deposit is made by arc welding, which process is usually employed, the arc should not be interrupted at any time while filling in a triangular section. This will eliminate craters in the deposit. If the welding operations on each rail end are terminated at the same end of the limiting diagonal only one crater will appear in each rail end and that will be at the side of the rail. The welding procedure on each rail end may advantageously be such that the welding operations are not terminated at points adjacent one another. That is, if the welding operations on the rail 1 are terminated at 12, then the welding operations on the rail 2 are terminated at 13.

Figure 3:

By employing a proper welding procedure and a suitable welding electrode it is possible to obtain a very flat bead of weld metal. The turns of the sinuous deposit should overlap one another a substantial amount. I generally use an overlap of fifty per cent as indicated in Fig. 3 of the drawing. As has been indicated in Fig. 2 of the drawing, the final portion of each deposit may completely overlap one another, and although when following this procedure an elevated ridge is obtained in the deposited metal at the diagonals 8 and 9, this is generally to be preferred to the possibility of an insufficient deposit such as may occur when these end portions only partially overlap one another.

By dividing the welding area at each rail end into triangular sections it is possible to fill in each section without causing the operator to interrupt the welding operation due to his fatigue or the complete consumption of a welding electrode. By dividing the welding area into triangular sections the material in the weld rod is always sufficient to completely fill in a section and standard 14 inch lengths of electrode are usually just sufficient for this purpose. By beginning and ending each welding operation at the side of the rail, craters or porous spots resulting therefrom are completely eliminated in the body of the deposit. Furthermore, a smooth deposit is obtained which greatly reduces the time required for grinding it to the same elevation as the adjacent surface of the rail. When using heavy coated electrodes my procedure makes it unnecessary for the operator to continue the welding operation at points covered by the slag resulting from an initial welding operation. This not only simplifies the welding operation but also eliminates the introduction of slag into the deposit. My procedure also secures a better distribution of heat in the rail end during the welding operation and eliminates the possibility of obtaining a porous deposit such as may occur from overheating.

If it is considered desirable to remove the location of the crater when it occurs at the end corner of a rail end, this may be accomplished by directing the electrode away from the rail joint along the edge of the rail and at the same time gradually increasing the arc length until the arc is broken.

The sinuous lines 10 noted in Fig. 2 of the drawing merely indicate the manner in which the bead of weld metal is deposited on the rail treads. The spacing of the convolutions will of course depend on the procedure employed as well as the type of electrode used. By using a suitable procedure with an electrode particularly adapted for my process it is possible to deposit beads of weld metal having a width from one to one and one-quarter inches when using an electrode a quarter of an inch in diameter.

After the treads of the rail ends have been built up in accordance with my procedure the rail surfaces are reduced to the same elevation as the adjacent running surface of each rail. This operation is preferably performed by grinding since in most cases the welding electrode employed in building up the rail ends will give a hard deposit which will effectively resist the wheel batter of vehicles passing over the joint. Whenever necessary the joint is slotted to remove any overflow of weld metal between the rails at the joint.

Although particularly suited for metallic arc welding my welding procedure is not limited thereto. Furthermore, my procedure is not limited to the specific arrangement of depositing the weld metal illustrated and described above for it is apparent that the oblique lines defining the inner boundary limits of welding on each rail end as well as the diagonals by means of which the weld areas on each rail end are divided into triangular sections may be marked upon the rail end in a different manner from that indicated in Fig. 2 while still following my procedure. Thus, while I have shown and described by way of example one procedure in accordance with my invention, it will be understood that I do not desire to be limited to the particular procedure illustrated and described, but wish to protect by Letters Patent all such changes, modifications and deviations as come within the scope of the appended claims.

What I claim as new and desire to secure by Letters Patent of the United States, is:—

1. The method of reconditioning worn rail joints by welding which comprises marking on the tread of each rail end just outside of the badly worn surface area thereof an oblique line which constitutes the inner boundary limit of the welding area on each rail end, dividing said welding area into triangular sections by marking a diagonal therein and restoring the worn rail surface by depositing in each of said triangular sections a flat sinuous bead of weld metal the individual turns of which overlap one another a substantial amount, said deposition being formed by a continuous welding operation which is initiated at the section vertices opposite said diagonal and terminated at one end of said diagonal.

2. The method of reconditioning worn rail joints by arc welding which comprises marking on the tread of each rail end an oblique line which defines a quadrilateral area including the badly worn rail surface, marking a diagonal in said quadrilateral area and restoring the worn rail surface by depositing by continuous arc welding operations which are initiated at the vertices of the quadrilateral opposite said diagonal and terminated at an end of said diagonal, a flat sinuous bead of weld metal the individual turns of which overlap one another a substantial amount.

3. The method of reconditioning worn rail joints by welding which comprises marking on the tread of each rail end beyond the worn surface thereof an oblique line which intersects said worn surface at the side of the rail, marking a second oblique line across said worn surface from the point of intersection of said first oblique line with said worn surface to the rail corner diagonally opposite thereto, and restoring the worn rail surface by depositing in each of the sections defined by said oblique lines a flat sinuous bead of weld metal the individual turns of which overlap one another at least fifty per cent, said depositions being formed by a continuous arc welding operation which is initiated in each section at the point most remote from said second oblique line and which is terminated at the same end of said second oblique line.

4. The method of reconditioning worn rail joints by welding which comprises determining the approximate inner limit of substantial wear on the tread of each rail end by laying a straight edge on the treads of the rails longitudinally thereof across the joint and gauging said limit by observing the distance between said straight edge and the treads of said rails, marking the inner boundary limit of welding on each rail end with an oblique line which defines a quadrilateral area which includes the worn rail end surface, marking a diagonal in said quadrilateral area and depositing in each triangular section determined by said diagonal a flat sinuous bead of weld metal the indidivdual turns of which overlap one another a substantial amount, said depositions starting at the section vertices opposite said diagonal and terminating at one end thereof and being of sufficient thickness to fill up completely the worn spot on each rail.

5. The method of reconditioning worn rail joints by arc welding which comprises determining the approximate inner limit of substantial wear on the tread of each rail end by laying a straight edge on the treads of the rails longitudinally thereof across the joint and gauging said limit by observing the distance between said straight edge and the treads of said rails, marking the inner boundary limit of welding on each rail end with an oblique line which defines a quadrilateral area which includes the worn rail end surface, marking a diagonal in said quadrilateral area and restoring the worn rail surface by depositing in each triangular section determined by said diagonal a flat sinuous bead of weld metal the individual turns of which overlap one another at least fifty per cent, said depositions being formed by continuous arc welding operations which are started at the section vertices opposite said diagonal and terminated at the same end of said diagonal.

BERNARD C. TRACEY.